United States Patent
Rai et al.

(10) Patent No.: US 8,140,107 B1
(45) Date of Patent: Mar. 20, 2012

(54) METHOD AND SYSTEM FOR SELECTIVE POWER CONTROL OF WIRELESS COVERAGE AREAS

(75) Inventors: Deveshkumar Rai, Overland Park, KS (US); Manoj Shetty, Overland Park, KS (US); Sachin R. Vargantwar, Overland Park, KS (US); Siddharth S. Oroskar, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 1073 days.

(21) Appl. No.: 11/969,645

(22) Filed: Jan. 4, 2008

(51) Int. Cl.
*H04B 7/212* (2006.01)
*H04B 7/185* (2006.01)
*H04B 7/00* (2006.01)
*H04B 7/005* (2006.01)
*H04W 36/00* (2009.01)
*H04W 4/00* (2009.01)
*H04J 3/00* (2006.01)
*H04J 3/16* (2006.01)
*H04J 3/22* (2006.01)
*H04J 11/00* (2006.01)

(52) U.S. Cl. ........ 455/525; 455/522; 455/513; 455/443; 370/278; 370/318; 370/336; 370/347; 370/465; 370/208; 370/329; 370/330; 370/337

(58) Field of Classification Search .................. 455/443, 455/513, 522, 525; 370/278, 318, 336, 347, 370/465, 208, 329, 330, 337
See application file for complete search history.

(56) References Cited

U.S. PATENT DOCUMENTS

| | | | |
|---|---|---|---|
| 4,765,753 | A | 8/1988 | Schmidt |
| 5,392,331 | A | 2/1995 | Patsiokas et al. |
| 5,508,708 | A | 4/1996 | Ghosh et al. |
| 5,539,744 | A | 7/1996 | Chu et al. |
| 5,574,979 | A | 11/1996 | West |
| 5,650,770 | A | 7/1997 | Schlager et al. |
| 5,862,190 | A | 1/1999 | Schaffner |

(Continued)

FOREIGN PATENT DOCUMENTS

WO PCT/KR2007/000061 A2    7/2007

OTHER PUBLICATIONS

K. Choi, et al., "Adaptive Data Rate Transmission in CDMA Networks Over Time Varying Traffic Channel", www.aranet.co.kr/sem__pdf/cdma/EEE/E4-2.pdf (visited Mar. 20, 2001), 4 pages.

(Continued)

*Primary Examiner* — Nay A Maung
*Assistant Examiner* — Bobbak Safaipour (57) ABSTRACT

In methods and systems for adjusting forward link transmit power of wireless coverage areas, forward link signal strength is observed to obtain a signal-to-noise ratio (SNR) and/or an observed frame error rate (FER) for the received signal. A determination is made whether to request a forward link power adjustment. If the determination is that a forward link power adjustment is required, a request may be made into a radio access network (RAN) to adjust power. The RAN may select a subset of wireless coverage areas in which to adjust power. If further power adjustment is required, a further request may be made into the RAN, and the RAN may select a different subset of wireless coverage areas in which to adjust power.

20 Claims, 7 Drawing Sheets

U.S. PATENT DOCUMENTS

| | | | |
|---|---|---|---|
| 5,940,743 | A | 8/1999 | Sunay et al. |
| 5,963,130 | A | 10/1999 | Schlager et al. |
| 6,014,375 | A | 1/2000 | Janky |
| 6,034,971 | A | 3/2000 | Love et al. |
| 6,088,594 | A | 7/2000 | Kingdon et al. |
| 6,097,972 | A | 8/2000 | Saints et al. |
| 6,100,806 | A | 8/2000 | Gaukel |
| 6,154,638 | A | 11/2000 | Cheng et al. |
| 6,198,390 | B1 | 3/2001 | Schlager et al. |
| 6,324,404 | B1 | 11/2001 | Dennison et al. |
| 6,341,224 | B1 | 1/2002 | Dohi et al. |
| 6,360,098 | B1 | 3/2002 | Ganesh et al. |
| 6,363,255 | B1 | 3/2002 | Kuwahara |
| 6,442,393 | B1 | 8/2002 | Hogan |
| 6,473,619 | B1 | 10/2002 | Kong et al. |
| 6,490,460 | B1 | 12/2002 | Soliman |
| 6,496,531 | B1 | 12/2002 | Kamel et al. |
| 6,522,888 | B1 | 2/2003 | Garceran et al. |
| 6,603,976 | B1 | 8/2003 | Amirijoo et al. |
| 6,609,008 | B1 | 8/2003 | Whang et al. |
| 6,631,263 | B1 | 10/2003 | Corkery |
| 6,662,019 | B2 | 12/2003 | Kamel et al. |
| 6,697,343 | B1 | 2/2004 | Kamel et al. |
| 6,704,368 | B1 | 3/2004 | Nefedov |
| 6,714,789 | B1 | 3/2004 | Oh et al. |
| 6,763,244 | B2 | 7/2004 | Chen et al. |
| 6,845,246 | B1 | 1/2005 | Steer |
| 6,859,652 | B2 | 2/2005 | Karabinis et al. |
| 7,065,361 | B1* | 6/2006 | Fortuna ................. 455/438 |
| 7,146,174 | B2 | 12/2006 | Gardner et al. |
| 7,164,669 | B2 | 1/2007 | Li et al. |
| 7,684,337 | B2* | 3/2010 | Mehta et al. ............. 370/238 |
| 8,023,950 | B2* | 9/2011 | Malladi et al. ............ 455/442 |
| 8,027,301 | B2* | 9/2011 | Oyman et al. ............. 370/330 |
| 2002/0111183 | A1* | 8/2002 | Lundby .................. 455/522 |
| 2003/0067890 | A1* | 4/2003 | Goel et al. ............... 370/310.1 |
| 2007/0101015 | A1* | 5/2007 | Larsson et al. ........... 709/238 |
| 2007/0147255 | A1* | 6/2007 | Oyman .................. 370/238 |
| 2007/0190934 | A1* | 8/2007 | Kim et al. ................ 455/7 |
| 2007/0211757 | A1* | 9/2007 | Oyman .................. 370/468 |
| 2007/0274237 | A1* | 11/2007 | Li et al. .................. 370/278 |
| 2009/0279467 | A1* | 11/2009 | Ji ......................... 370/311 |
| 2010/0322167 | A1* | 12/2010 | Kurose .................. 370/329 |

OTHER PUBLICATIONS

W. Marshall, et al, "Integration of Resource Management and Call Signaling for IP Telephony" www.softarmor.com/sipwg/drafts/morgue/draft-dcsgroup-sip-resource-00.txt (visited Apr. 9, 2002), 11 pages.

Thomas Frieling, "Re: Available Bit Rate Service" www.cell-relay.indiana.edu/mhonarc/cell-relay/1999-Jun/msg00050.html (visited Mar. 20, 2001), 2 pages.

Introduction to cdma2000 Standards for Spread Spectrum Systems, Mar. 2000, TIA Ballot Resolution Version, TIA/EIA/IS2000 Part 2-A-1; Table of Contents, pp. i-xlvi; Section 2.1.2 (Power Output Characteristics), pp. 2-37 to 2-60; Section 2.1.3 (Modulation Characteristics) pp. 2-61 to 2-202.

Introduction to cdma2000 Standards for Spread Spectrum Systems, Mar. 2000, TIA Ballot Resolution Version, TIA/EIA/IS2000 Part 5-A-1; Table of Contents, pp. i-xliv; Section 2.6.4 (Mobile Station Control on the Traffic Channel State), pp. 2-243 to 2-327; Section 3.6.4 (Traffic Channel Processing), pp. 3-24 to 3-61; Section 3.7.3 (f-dsch), pp. 3-338 to 3-584.

Office Action from U.S. Appl. No. 09/644,292 dated Jan. 30, 2003.
Office Action from U.S. Appl. No. 09/644,292 dated Jul. 16, 2003.

* cited by examiner

METHOD AND SYSTEM FOR SELECTIVE POWER CONTROL OF WIRELESS COVERAGE AREAS

BACKGROUND

Wireless communication networks may consist of one or more wireless communication devices (WCD's), and infrastructure in the form of a radio access network (RAN). WCD's may be mobile phones, portable computers, personal digital assistants (PDA's) or any other mobile or fixed computing device with a wireless network interface. A RAN may comprise one or more base transceiver stations (BTS's), one or more base station controllers (BSC's), and backhaul connections between these infrastructure components. The RAN may be connected to other networks such as the Internet, private Internet Protocol (IP) networks, and the public switched telephone network (PSTN).

A BTS may comprise one or more transceivers, which radiate to define wireless coverage areas. These wireless coverage areas are more commonly referred to as cell sites or sectors, and may comprise wireless coverage radiated from a BTS, a plurality of BTS's, or a portion or a single BTS. However, the present discussion is not limited by the inclusion of such terminology. With these wireless coverage areas, BTS's may provide wireless network connectivity to one or more WCD's by allocating portions of their air interface capacities to the served WCD's. The BSC's preferably supervise the operation of the BTS's. A BSC may control when a BTS allocates or de-allocates air interface resources to particular WCD's, and may manage the handoffs of WCD's from one wireless coverage area to another. Regardless of the technology used to create the wireless signals, communication channels that transmit from the RAN to the WCD's are preferably called forward link channels, and communication channels that transmit from the WCD's to the RAN are preferably called reverse link channels.

WCD's may be in communication with one or more wireless coverage areas simultaneously, and a WCD may be receiving forward link signals of different strengths from each wireless coverage area. A group of wireless coverage areas that the WCD is receiving signals from may be called the WCD's "active set," however a WCD may also receive signals from wireless coverage areas not in its active set. The BTS's that define a WCD's active set may be referred to as the serving BTS's of the WCD. Maintaining communication with multiple wireless coverage areas simultaneously provides advantages for a WCD, including but not limited to making handoffs faster and less disruptive. Therefore, it is desirable for a WCD to maintain a certain threshold of forward link signal strength from the wireless coverage areas in its active set.

A WCD may influence the power of forward link transmissions from the RAN. A WCD may compare the signal strength received from a given wireless coverage area to a threshold. If the received forward link signal strength is too low, the WCD may request the RAN to increase the wireless coverage area's signal strength. This determination can be accomplished by, for example, the WCD measuring the signal-to-noise ratio (SNR) or frame error rate (FER) for the received forward link signal from one or more wireless coverage areas in its active set, and comparing the measured values to a threshold. Depending on the outcome of this comparison, the WCD may request that the RAN increase the power of the forward link signals of the wireless coverage areas in the WCD's active set. The WCD may continue to request that the RAN increase forward link transmission power in the WCD's active set, until the WCD is receiving forward link signals of sufficient strength.

Likewise, if the received forward link signal strength is too high, the WCD may request the RAN to decrease the wireless coverage area's signal strength. The WCD may request that the RAN decrease the power of the forward link signals of the wireless coverage areas in the WCD's active set. The WCD may continue to make this request until the WCD is receiving forward link signals of an appropriate strength.

When the RAN adjusts the forward link power of a wireless coverage area upon an adjustment request from a WCD, the adjustment is typically limited to the forward link channels serving the requesting WCD. Forward link channels serving other WCD's are preferably not directly impacted.

In this way, transmission power of the wireless coverage areas in a WCD's active set may be either increased or decreased so that the system maintains a desired signal quality despite changing conditions.

Overview

In the wireless power control scenarios described above, it may not be necessary for the RAN to adjust the forward link transmission power within all of the wireless coverage areas in a WCD's active set. The physical characteristics of wireless signal propagation make it likely that the WCD may experience the most benefit from the RAN adjusting the power of the wireless coverage areas with the strongest measured signals at the WCD. Adjusting the forward link signal strength within the wireless coverage areas with the weakest measured signals at the WCD is less likely to sufficiently change the received signal strength at the WCD. By the RAN adjusting power in the subset of wireless coverage areas with the strongest signals, forward link channel capacity may be used more efficiently so that potentially more WCD's can be served by the RAN.

For example, suppose a WCD served by an active set of five wireless coverage areas determines that the power of its received forward link signals is too low. In order for the WCD to meet its forward link signal strength threshold, it may be sufficient for the RAN to instruct the BTS's to increase their forward link power in a subset of only the one or two of the wireless coverage areas with the strongest signals. However, if WCD still is not receiving signals of sufficient strength after this power adjustment, the WCD may continue requesting that the RAN increase forward link power in the WCD's active set. Responsive to this request, the RAN may instruct the WCD's serving BTS's to increase the forward link power of more of the WCD's wireless coverage areas, until ultimately the RAN has increased the power of all of the wireless coverage areas in the WCD's active set.

Similarly, when the WCD requests that the RAN decrease forward link power transmitted by the wireless coverage areas in the WCD's active set, the RAN may not need to decrease the forward link power of all wireless coverage areas in the WCD's active set. Instead, the RAN may instruct the serving BTS's to decrease forward link power in a subset of the WCD's active set that contains the strongest forward link signals as measured at the WCD. This may be sufficient to meet the WCD's forward link signal strength requirements. Of course, if the WCD still is receiving signals that are too strong after this power adjustment, the WCD may continue requesting that the RAN decrease forward link power. Responsive to these requests, the RAN may instruct the WCD's serving BTS's to decrease the forward link signal strength to the WCD in a larger number of wireless coverage areas.

Thus, in a preferable scheme, power is adjusted in a minimal subset of a WCD's wireless coverage areas the so that the WCD's power requirements are met. If this adjustment does not sufficiently improve the WCD's received signal strength, the RAN may instruct the serving BTS's to adjust power in a larger subset of wireless coverage areas. By the RAN adjusting power in such that the wireless coverage area's forward link strength is not too high and not too low, the WCD meets its power requirements without utilizing excess RAN capacity. Additional capacity conserved by this approach can be allocated to other WCD's, thus improving the efficiency of the RAN's air interface power management.

A first preferred embodiment presents a method for adjusting the transmission power of a plurality of wireless coverage areas. In accordance with the method, a WCD receives a forward link signal from each of the wireless coverage areas in the WCD's active set, and measures each signal's power. Based on the outcome of a comparison of these measurements to a first threshold, the WCD determines that power adjustment is necessary, and sends a plurality of power adjustment commands to the RAN. The WCD may also send of copy of the power measurements to the RAN. Based on the extent of the power adjustment commands, the power measurements, and a second threshold, the RAN determines in which subset of the wireless coverage areas in the active set to adjust power. The RAN instructs the serving BTS's to adjust their forward link transmission power in the selected wireless coverage areas.

A second preferred embodiment presents a method for adjusting the transmission power of a plurality of wireless coverage areas. In accordance with the method, a WCD receives a forward link signal from each of the wireless coverage areas in the WCD's active set, and measures each signal's power. Based on the outcome of a comparison of these measurements to a first threshold, the WCD determines that power adjustment is necessary, and sends a plurality of power adjustment commands to the RAN, comprising of at least a first set and a second set. The WCD may also send a copy of the power measurements to the RAN. Based on the extent of the first set of power adjustment commands, the power measurements, and a second threshold, the RAN determines a first subset of the wireless coverage areas in the active set in which to adjust power. The RAN may then instruct the serving BTS's to adjust their forward link transmission power in this first subset of wireless coverage areas. Similarly, based on the extent of the second set of power adjustment commands, the power measurements, and the second threshold, the RAN determines a second subset of the wireless coverage areas in the active set in which to adjust power. The RAN may then instruct the serving BTS's to adjust their forward link transmission power in this second subset of wireless coverage areas.

A third preferred embodiment presents a system for controlling power between a WCD and a RAN. The system comprises at least one WCD, at least one BTS that radiates to define a plurality of wireless coverage areas, and at least one BSC. Within this system, a WCD receives a forward link signal from each of the wireless coverage areas in the WCD's active set, and measures each signal's power. Based on the outcome of a comparison of these measurements to a first threshold, the WCD may determine that power adjustment is necessary, and may send a plurality of power adjustment commands to the RAN, comprised of at least a first set and a second set. The WCD may also send a copy of the power measurements to the RAN. Based on the extent of the first set of power adjustment commands, the power measurements, and a second threshold, the RAN determines a first subset of the wireless coverage areas in the active set in which to adjust power. The RAN may then instruct the serving BTS's to adjust their forward link transmission power in this first subset of wireless coverage areas. Similarly, based on the extent of the second set of power adjustment commands, the power measurements, and the second threshold, the RAN determines a second subset of the wireless coverage areas in the active set in which to adjust power. The RAN may then instruct the serving BTS's to adjust their forward link transmission power in this second subset of wireless coverage areas.

These and other aspects and advantages will become apparent to those of ordinary skill in the art by reading the following detailed description, with reference where appropriate to the accompanying drawings. Further, it should be understood that the foregoing summary is merely exemplary and is not intended to limit the scope of the invention as claimed.

DESCRIPTION

Figure 1:
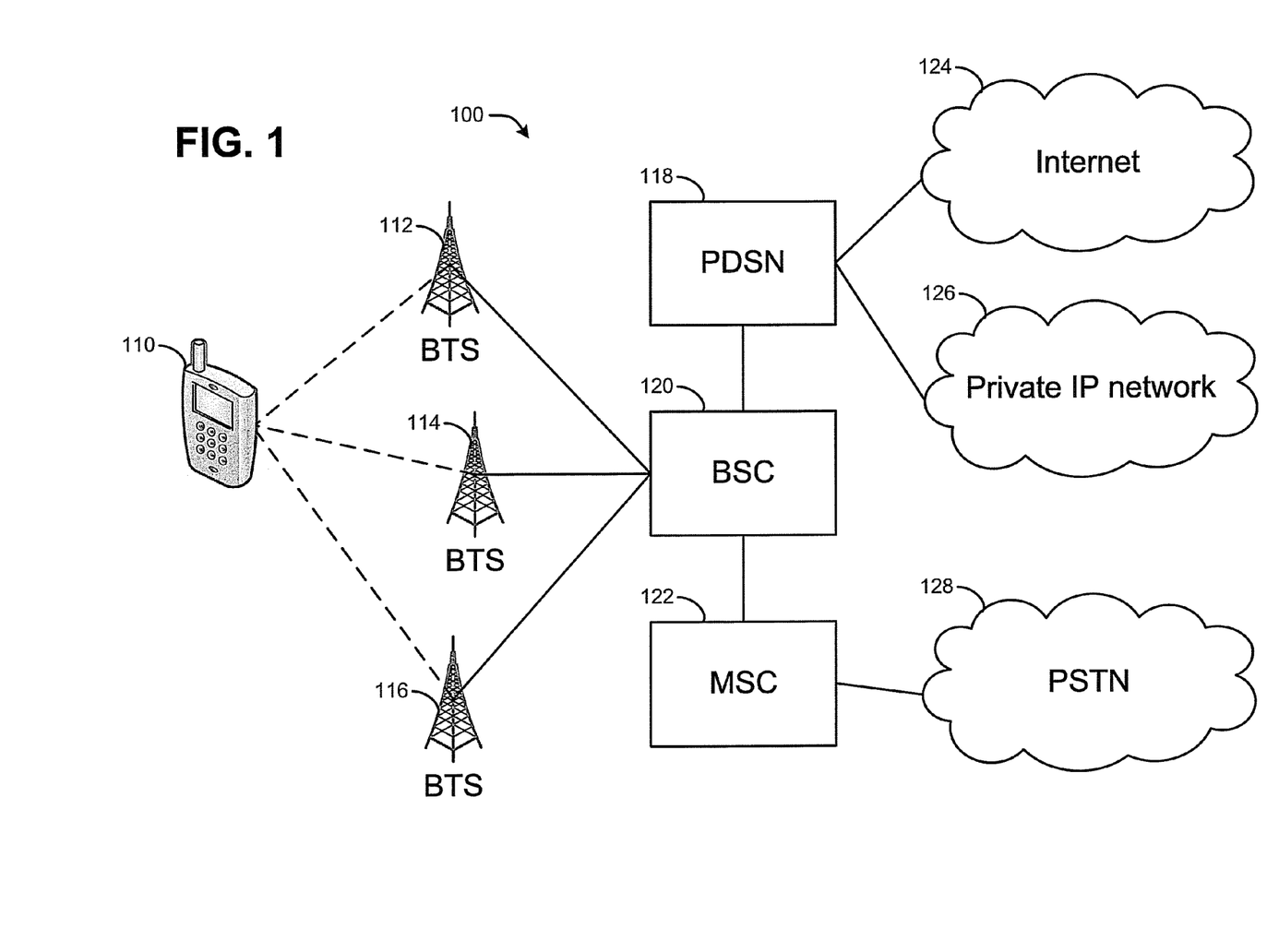
FIG. 1 is a block diagram of a telecommunications network, in accordance with an exemplary embodiment.

FIG. 1 is a simplified block diagram of an exemplary telecommunications network 100, in which exemplary embodiments may be employed. Network 100 includes base transceiver stations (BTS's) 112, 114, 116 that can communicate with a wireless communication device (WCD) 110 via an air interface that includes a plurality of wireless coverage areas. WCD 110 could be a wireless telephone, wireless personal digital assistant, wirelessly equipped laptop computer, wireless router, or other type of mobile or fixed wireless device.

BTS's 112, 114, 116 radiate to define wireless coverage areas. Each wireless coverage area provides air interface access to WCD 110 and any other WCD's served by the coverage area. A single BTS 112, 114, 116 may define one or more wireless coverage areas. The air interface may include a forward link transmitted from a BTS 112, 114, 116 to WCD 110 and a reverse link transmitted from WCD 110 to a BTS 112, 114, 116 in order for these devices to exchange voice, data, video, or other media. In this regard, WCD 110 may use the wireless coverage areas defined by BTS's 112, 114, 116 to communicate with one or more endpoints, e.g., other WCD's, e-mail servers, world wide web servers, gaming servers, media servers, media gateways, or location-based services, via a packet-switched network (e.g., the Internet 124 or private IP network 126), and/or a circuit-switched network, such as the public switched telephone network (PSTN) 128. For example, BTS's 112, 114, 116 may be communicatively coupled to a base station controller (BSC) 120. BSC 120 may, in turn, be communicatively coupled to packet-switched networks 124, 126 via a packet data serving node (PDSN) 118. Alternatively or additionally, BSC 120 may be communicatively coupled to PSTN 128 via a mobile switching center (MSC) 122.

Although FIG. 1 shows only three BTS's 112, 114, 116, it is to be understood that network 100 may include fewer or more than three BTS's 112, 114, 116. These BTS's may be communicatively coupled to BSC 120 or to other network elements that are communicatively coupled to packet-switched networks 124, 126 and/or PSTN 128. Furthermore, WCD 110 may be able to transfer ongoing communication sessions from one BTS to another in a handoff process. Network 100 may also include multiple BSC's 120, PDSN's 118, and MSC's 122. The combination of network elements including BTS's 112, 114, 116, BSC 120, PDSN 118, and MSC 122 may be collectively referred to as a radio access network (RAN). However, a RAN may also be defined to comprise more or fewer elements. For example, a RAN may comprise a single BTS and a single BSC. Furthermore, these elements may be combined with one another; for example, a BTS and a BSC may be physically co-located or may be comprised within the same physical element.

The entity or entities of the RAN that carry out the method functions preferably include a processor, data storage, and program instructions stored in the data storage and executable by the processor to carry out the functions. Similarly, a WCD that carries out the method functions preferably includes a processor, data storage, and program instructions stored in the data storage and executable by the processor to carry out the functions.

Figure 2:
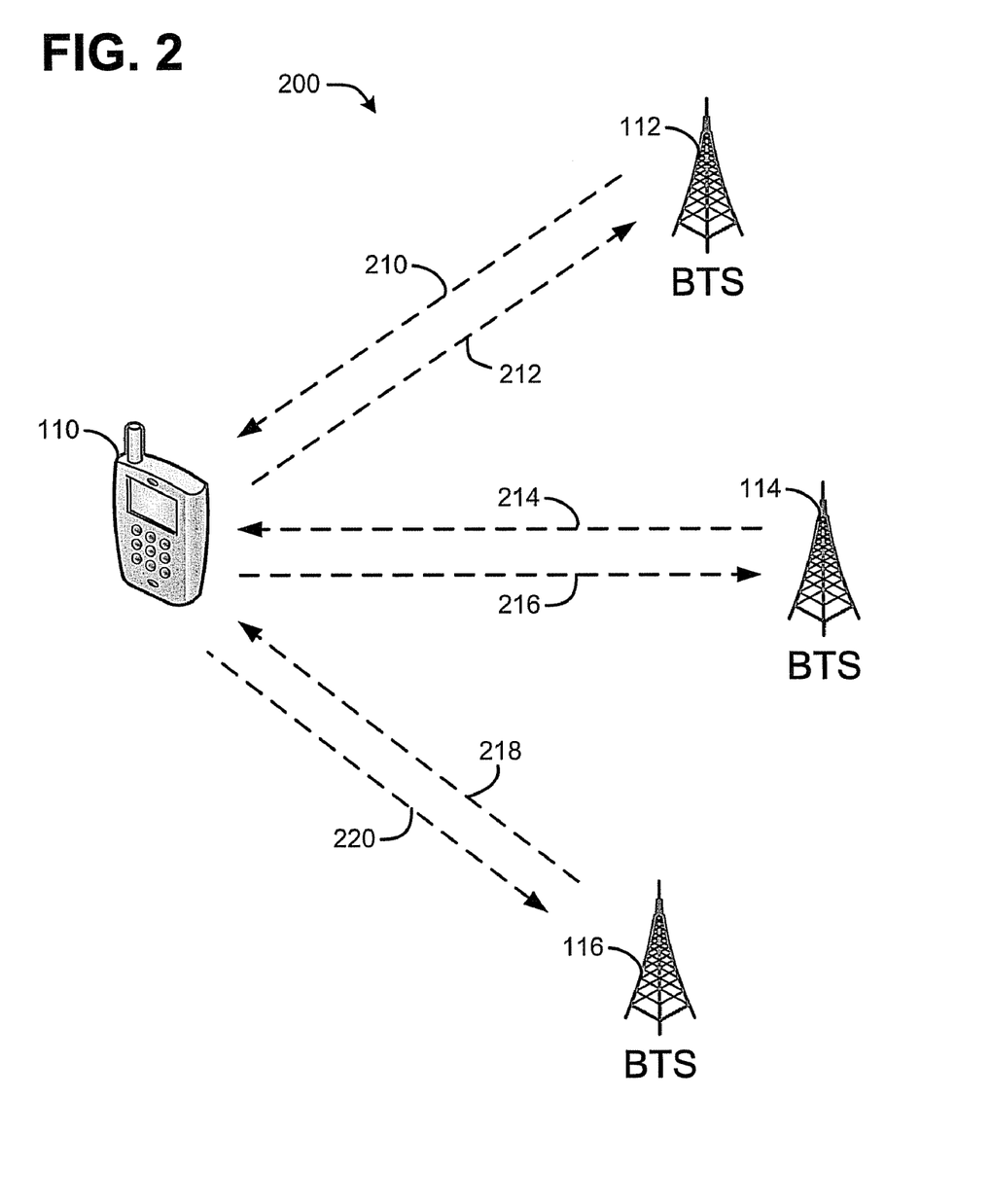
FIG. 2 is a block diagram of an air interface, in accordance with an exemplary embodiment.

FIG. 2 illustrates the air interface 200 of network 100 in more detail. WCD 110 and BTS 112 communicate via forward link 210 and reverse link 212. Similarly, WCD 110 and BTS 114 communicate via forward link 214 and reverse link 216, and WCD 110 and BTS 116 communicate via forward link 218 and reverse link 220. BTS 112, 114, 116 may control the power levels of forward links 210, 214, 218, respectively, or another element of the RAN, such as a BSC, may directly or indirectly control the power levels of these forward links.

The forward and reverse links may each include a plurality of channels, including traffic channels and signaling channels. Each of the reverse links channels may be unicast channels between the WCD 110 and a single BTS, or multicast or broadcast channels between WCD 110 and one or more BTS's. Likewise, each of the forward links may be unicast channels between one of BTS 112, 114, 116 and a single WCD, or multicast or broadcast channels between one of BTS 112, 114, 116 and multiple WCD's. In an exemplary embodiment, the channels are code division multiple access (CDMA) channels in accordance with cdma2000 specifications. However, other air interface formats, such as those of Worldwide Interoperability for Microwave Access (WIMAX) or Universal Mobile Telecommunications System (UMTS), could be used.

Without loss of generality, and for sake of simplicity, assume that forward links 210, 214, 218 emanating from BTS's 112, 114, 116, respectively, are associated with different wireless coverage areas defined by BTS's 112, 114, 116. WCD 110 may receive the signals of forward links 210, 214, 218 of air interface 200 at different power levels. For example, WCD 110 may receive a stronger signal from forward link 210 than from forward link 214, and WCD 110 may receive a stronger signal from forward link 214 than from forward link 218. This may be due to factors such as the distance between BTS's 112, 114, 116 and WCD 110, interference on the air interface between BTS's 112, 114, 116 and WCD 110, the power transmitted by BTS's 112, 114, 116 on their respective forward links 210, 214, 218, a combination of some or all of these factors, or other factors altogether.

Furthermore, other WCD's in the wireless coverage areas defined by BTS's 112, 114, 116 may receive the signals of their respective forward links from BTS's 112, 114, 116 at different power levels than WCD 110. Again, this may be due to factors such as the distance between BTS's 112, 114, 116 and each WCD, interference on the air interface between BTS's 112, 114, 116 and each WCD, the power transmitted by BTS's 112, 114, 116 on their respective forward links to each WCD, a combination of some or all of these factors, or other factors altogether. The result is that each WCD may receive a different forward link power on each channel, from each BTS 112, 114, 116.

Some air interface technologies, such as CDMA, share forward link capacity between WCDs. Thus, the less power that a given BTS needs for transmitting on a forward link to a given WCD, the more power is available for the BTS to transmit a stronger forward link signal to neighboring WCDs. If BTS's 112, 114, 116 transmit using too much power on forward links 210, 214, 218, WCD 110 may receive signals of sufficient strength, but neighboring WCDs may have less air interface capacity and/or forward link signal strength. Conversely, if BTS's 112, 114, 116 transmit using too little power on forward links 210, 214, 218, WCD 110 may not receive forward link signals of sufficient strength. As a result of poor forward link signal strength, WCD 110 may experience a lower signal-to-noise ratio (SNR), higher frame error rate (FER), and/or other deleterious factors that may dramatically interfere with voice and data quality. Thus, it is advantageous for each BTS 112, 114, 116 to transmit at an appropriate forward link power level to WCD 110, and neighboring WCDs.

Furthermore, as is known in the art, cellular network signal strength varies from time to time, as patterns of interference change and/or the WCD moves between locations. In order to adapt quickly to these environmental changes, system 100 allows the forward link power level between a BTS and a WCD to be adjusted dynamically. One way of doing so is based on the measured forward link power level at the WCD.

Each WCD may contain one or more threshold levels of forward link power. Such a threshold could be expressed in terms of SNR, FER, or in other ways. In the case of a CDMA air interface, the SNR may correspond to $E_b/N_0$, where $E_b$ is the energy per bit of the signal received by the WCD and the $N_0$ is the noise power spectral density. Regardless of the exact measurement technique, a WCD may contain an upper and/or a lower threshold. When the measured forward link signal strength at the WCD within one or more wireless coverage areas falls below the lower threshold, the WCD may request that the RAN increase forward link power to the WCD. Likewise, when measured forward link signal strength at the WCD within one or more wireless coverage areas rises above the upper threshold, the WCD may request that the RAN decrease forward link power to the WCD.

These requests to increase and decrease forward link power within wireless coverage areas serving a WCD are typically signaled from the WCD to the RAN on a reverse link channel. The messages containing these requests can be referred to as power adjustment commands, and in the case of a CDMA air interface, may take the form of power sense measurement messages. Upon receiving a power adjustment command, the RAN may determine that the power with the WCD's active set of serving wireless coverage areas needs to be adjusted, and the RAN may perform such an adjustment.

Referring again to FIG. 2, the active set of WCD 110 may contain wireless coverage areas defined by BTS's 112, 114, 116, and WCD 110 may be receiving forward link signals of different strengths from each BTS 112, 114, 116. For example, suppose that WCD 110 is receiving the strongest forward link signal from BTS 112, a weaker forward link signal from BTS 114, and the weakest forward link signal from BTS 116. If WCD 110 determines that its received forward link signal strength is too weak, it may send a power adjustment message to the RAN requesting an increase of forward link power within its serving wireless coverage areas. However, if the RAN increases the forward link power of each of BTS's 112, 114, 116, air interface capacity may be wasted.

Assume that the air interface between WCD 110 and BTS 116 may be subject to significant interference, while the air interfaces between WCD 100 and BTS 112 and WCD 110 and BTS 114 are not subject to significant interference. Then, the RAN increasing the forward link transmit power between BTS 116 and WCD 110 may have little or no impact on the associated forward link power measured by WCD 110. Instead, increasing the forward link transmit power from BTS 112 to WCD 110, or increasing the forward link transmit power from both BTS 112 and BTS 114 to WCD 110 may result in WCD 110 receiving a forward link signal strength above the lower threshold of WCD 110. By increasing power in a subset of BTS's 112, 114, 116 that define the wireless coverage area active set of WCD 110, the forward link power requirements of WCD 110 may be met while conserving air interface capacity for neighboring WCD's.

Likewise, if WCD 110 determines that its forward link signal strength is too strong, it may send a power adjustment command to the RAN requesting a decrease of forward link power. Again, assume that the air interface between WCD 110 and BTS 116 may be subject to significant interference, while the air interfaces between WCD 100 and BTS 112 and WCD 110 and BTS 114 are not subject to significant interference. If the forward link transmit power between BTS 116 and WCD 110 is decreased, the associated forward link signal strength may be degraded to the point that WCD 110 is unable to receive any signal from WCD 110. (In some cases it may be desirable to reduce the forward link power within a particular wireless coverage area to the point where it no longer serves the WCD and is thus eliminated from the active set. However such procedures are not discussed in detail within this specification). Instead, decreasing the forward link transmit power from BTS 112 to WCD 110, or decreasing the forward link transmit power from both BTS 112 and BTS 114 to WCD 110 may result in the received forward link signal strength at WCD 110 falling below the upper threshold of forward link signal strength of WCD 110. By decreasing power in a subset of BTS's that define the wireless coverage area active set of WCD 110, the forward link power requirements of WCD 110 may be met while maintaining sufficiently strong forward-link signals from each of BTS's 112, 114, 116.

Thus, it is advantageous for a RAN to select a subset of wireless coverage areas in a WCD's active set, and adjust the forward link power in these wireless coverage areas. In order to facilitate the RAN's selection process, a WCD may transmit to the RAN its measured forward link signal strength from each wireless coverage area in the WCD's active set. This allows the RAN to rank each wireless coverage area serving the WCD in order of received forward-link signal strength, for example from highest to lowest. Thus ranked, the RAN can more easily determine the subset of wireless coverage area with the highest measured forward link signal strengths at the WCD.

Furthermore, as the RAN receives more power increase commands from WCD 110, it is advantageous for the RAN to increase forward link power in more wireless coverage areas in the active set of WCD 110. This allows the RAN to respond quickly as the characteristics of the air interface between WCD 110 and its serving BTS's 112, 114, 116 changes. For the same reason, as the RAN receives more power decrease commands from WCD 110, it is advantageous for the RAN to decrease forward link power in more wireless coverage areas in the active set of WCD 110.

Figure 3A:
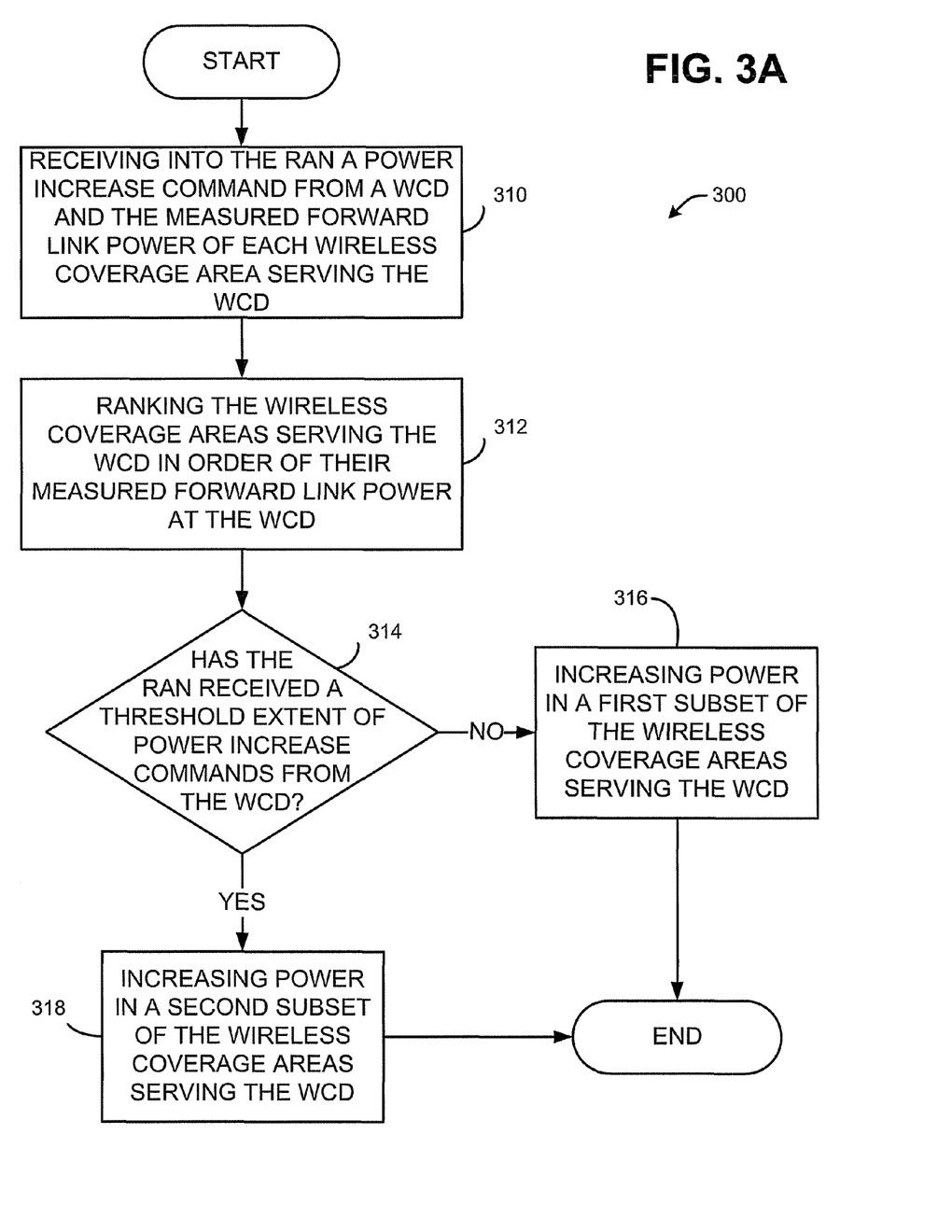
FIG. 3A is a flow chart illustrating a method for forward link power control, in accordance with an exemplary embodiment.

FIG. 3A illustrates an exemplary method 300 for increasing the forward link signal strength in wireless coverage areas serving a WCD. In block 310, the RAN receives a power increase command from a WCD, along with the measured forward link power of each wireless coverage area in the WCD's active set. In block 312, the RAN ranks the wireless coverage areas in order of their measured forward link power at the WCD. Preferably this ranking results in a listing of the wireless coverage areas in order of strongest measured forward link power to weakest measured forward link power.

In block 314, the RAN determines if it has received an extent of power increase commands from the WCD. This extent may be a numerical value configured in the RAN, preferably referring to a number of consecutively received power increase commands. However the scope of the method is not limited to such an interpretation. For example, the extent of power increase commands may refer to receiving at least x power increase commands out of the last y power adjustment commands received by the RAN.

If the determination is that the RAN has not received the extent of power increase commands, in block 316 the RAN may increase power in a first subset of wireless coverage areas serving the WCD. If the determination is that the RAN has received the extent of power increase commands, in block 318 the RAN may increase power in a second subset of wireless coverage areas serving the WCD. It is preferable that the first subset of wireless coverage areas is smaller than the second subset of wireless coverage areas. It is also preferable that the second subset of wireless coverage areas includes the first subset of wireless coverage areas. However other relationships between the first and second subset of wireless coverage areas may exist.

Figure 3B:
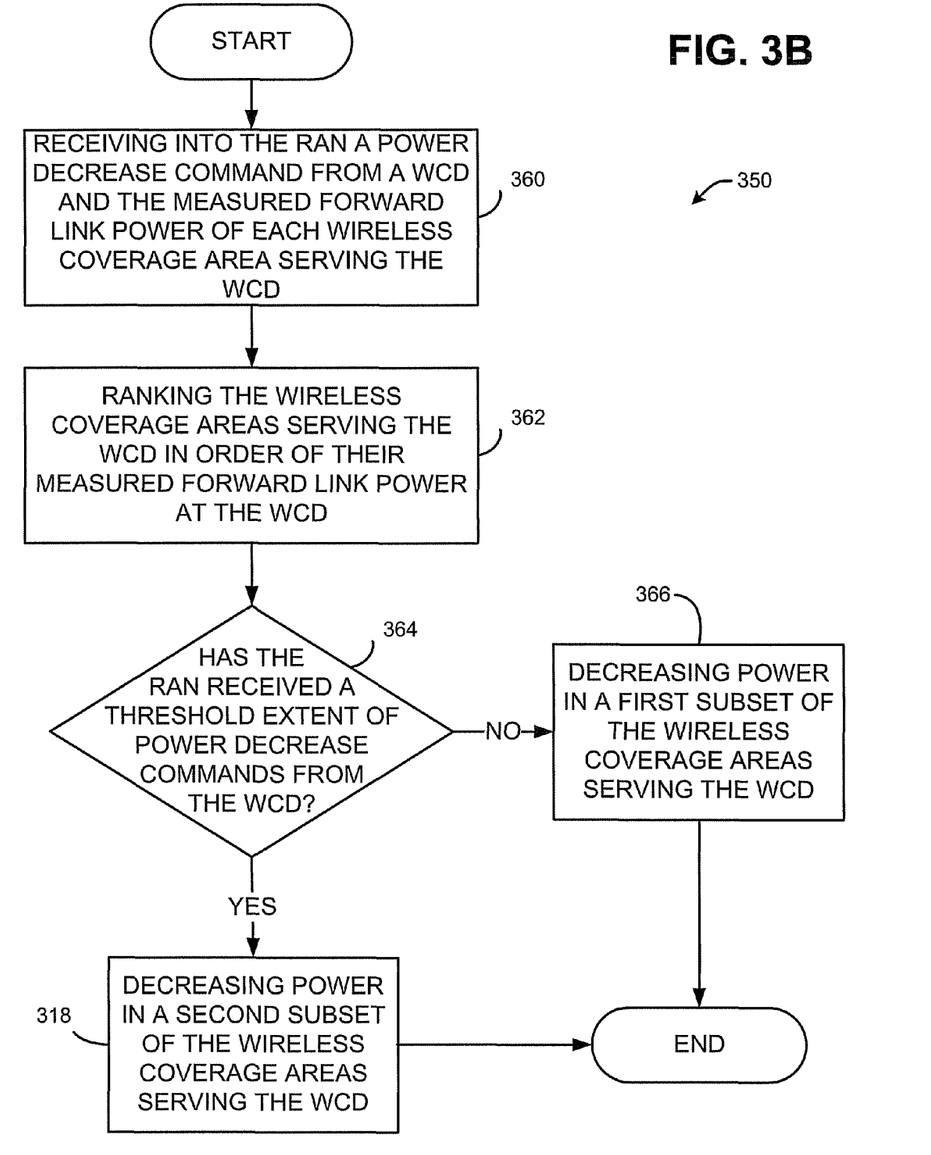
FIG. 3B is a flow chart illustrating a method for forward link power control, in accordance with an exemplary embodiment.

FIG. 3B illustrates an exemplary method 350 for decreasing the forward link signal strength in wireless coverage areas serving a WCD. In block 360, the RAN receives a power decrease command from a WCD, along with the measured forward link power of each wireless coverage area in the WCD's active set. In block 362, the RAN ranks the wireless coverage areas in order of their measured forward link power at the WCD. Preferably this ranking results in a listing of the wireless coverage areas in order of strongest measured forward link power to weakest measured forward link power.

In block 364, the RAN determines if it has received an extent of power decrease commands from the WCD. Similar to method 300, this extent may be a numerical value configured in the RAN, preferably referring to a number of consecutively received power decrease commands. However the scope of the method is not limited to such an interpretation. For example, the extent of power decrease commands may refer to receiving at least x power decrease commands out of the last y power adjustment commands received by the RAN.

If the determination is that the RAN has not received the extent of power decrease commands, in block 366 the RAN may decrease power in a first subset of wireless coverage areas serving the WCD. If the determination is that the RAN has received the extent of power decrease commands, in block 368 the RAN may decrease power in a second subset of wireless coverage areas serving the WCD. Similar to method 300, it is preferable that the first subset of wireless coverage areas is smaller than the second subset of wireless coverage areas. It is also preferable that the second subset of wireless coverage areas includes the first subset of wireless coverage areas. However other relationships between the first and second subset of wireless coverage areas may exist.

Figure 4A:
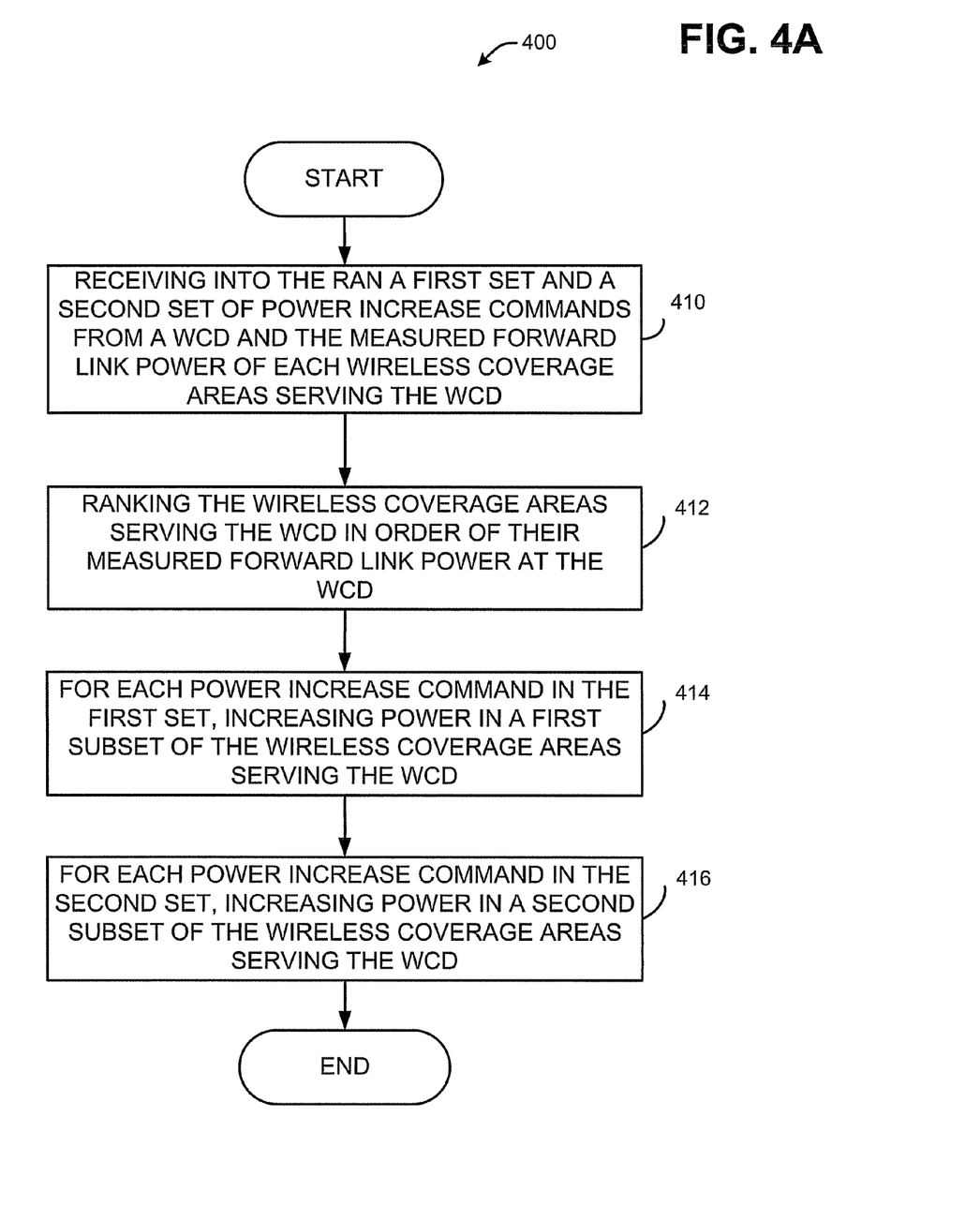
FIG. 4A is a flow chart illustrating a method for forward link power control, in accordance with an exemplary embodiment.

FIG. 4A illustrates an exemplary method 400 for increasing the forward link signal strength in wireless coverage areas serving a WCD. In block 410, the RAN receives a first set and a second set of power increase commands from a WCD, along with the measured forward link power of each wireless coverage area associated in the WCD's active set. In block 412, the RAN ranks the wireless coverage areas in order of their measured forward link power at the WCD. Preferably this ranking results in a listing of the wireless coverage areas in order of strongest measured forward link power to weakest measured forward link power.

In block 414, for each power increase command in the first subset, the RAN increases the power in a first subset of wireless coverage areas serving the WCD. This first subset of wireless coverage areas may be chosen by selecting the wireless coverage areas with the highest ranking of forward link power measured at the WCD. However, other methods of selection may be used.

In block 416, for each power increase command in the second subset, the RAN increases the power in a second subset of wireless coverage areas serving the WCD. This second subset of wireless coverage areas may also be chosen by selecting the wireless coverage areas with the highest ranking of forward link power measured at the WCD. Again, other methods of selection may be used. It is preferable that the first subset of wireless coverage areas is smaller than the second subset of wireless coverage areas. It is also preferable that the second subset of wireless coverage areas includes the first subset of wireless coverage areas. However other relationships between the first and second subset of wireless coverage areas may exist.

Alternatively, a WCD may transmit more than two sets of power increase commands, and responsively, the RAN may increase power in more than two subsets of the plurality of wireless coverage areas.

Figure 4B:
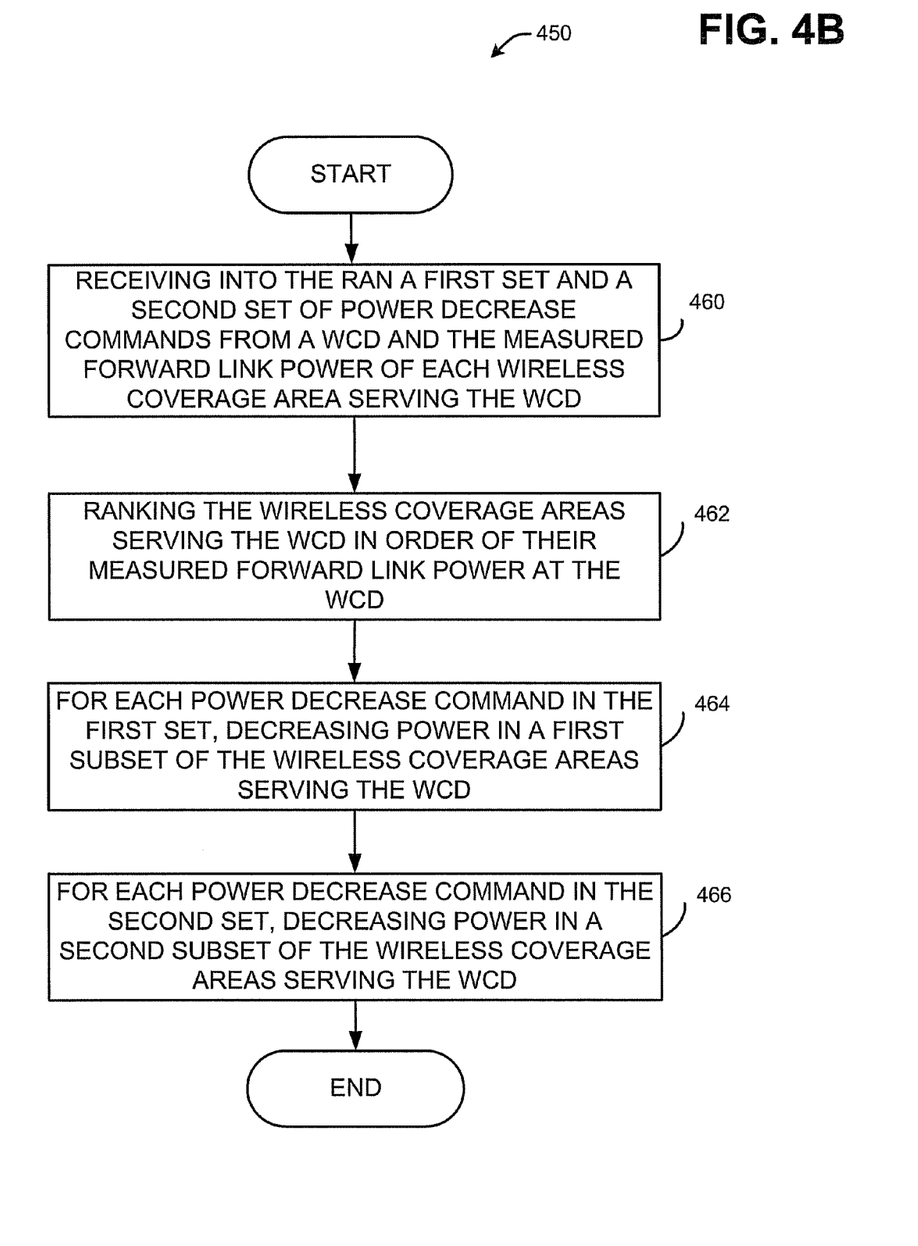
FIG. 4B is a flow chart illustrating a method for forward link power control, in accordance with an exemplary embodiment.

FIG. 4B illustrates an exemplary method 450 for decreasing the forward link signal strength in wireless coverage areas serving a WCD. In block 460, the RAN receives a first set and a second set of power decrease commands from a WCD, along with the measured forward link power of each wireless coverage area associated in the WCD's active set. In block 462, the RAN ranks the wireless coverage areas in order of their measured forward link power at the WCD. Preferably this ranking results in a listing of the wireless coverage areas in order of strongest measured forward link power to weakest measured forward link power.

In block 464, for each power decrease command in the first subset, the RAN decreases the power in a first subset of wireless coverage areas serving the WCD. This first subset of wireless coverage areas may be chosen by selecting the wireless coverage areas with the highest ranking of forward link power measured at the WCD. However, other methods of selection may be used. In block 466, for each power decrease command in the second subset, the RAN decreases the power in a second subset of wireless coverage areas serving the WCD. This second subset of wireless coverage areas may also be chosen by selecting the wireless coverage areas with the highest ranking of forward link power measured at the WCD. Again, other methods of selection may be used. It is preferable that the first subset of wireless coverage areas is smaller than the second subset of wireless coverage areas. It is also preferable that the second subset of wireless coverage areas includes the first subset of wireless coverage areas. However other relationships between the first and second subset of wireless coverage areas may exist.

Alternatively, a WCD may transmit more than two sets of power decrease commands, and responsively, the RAN may decrease power in more than two subsets of the plurality of wireless coverage areas.

Figure 5:
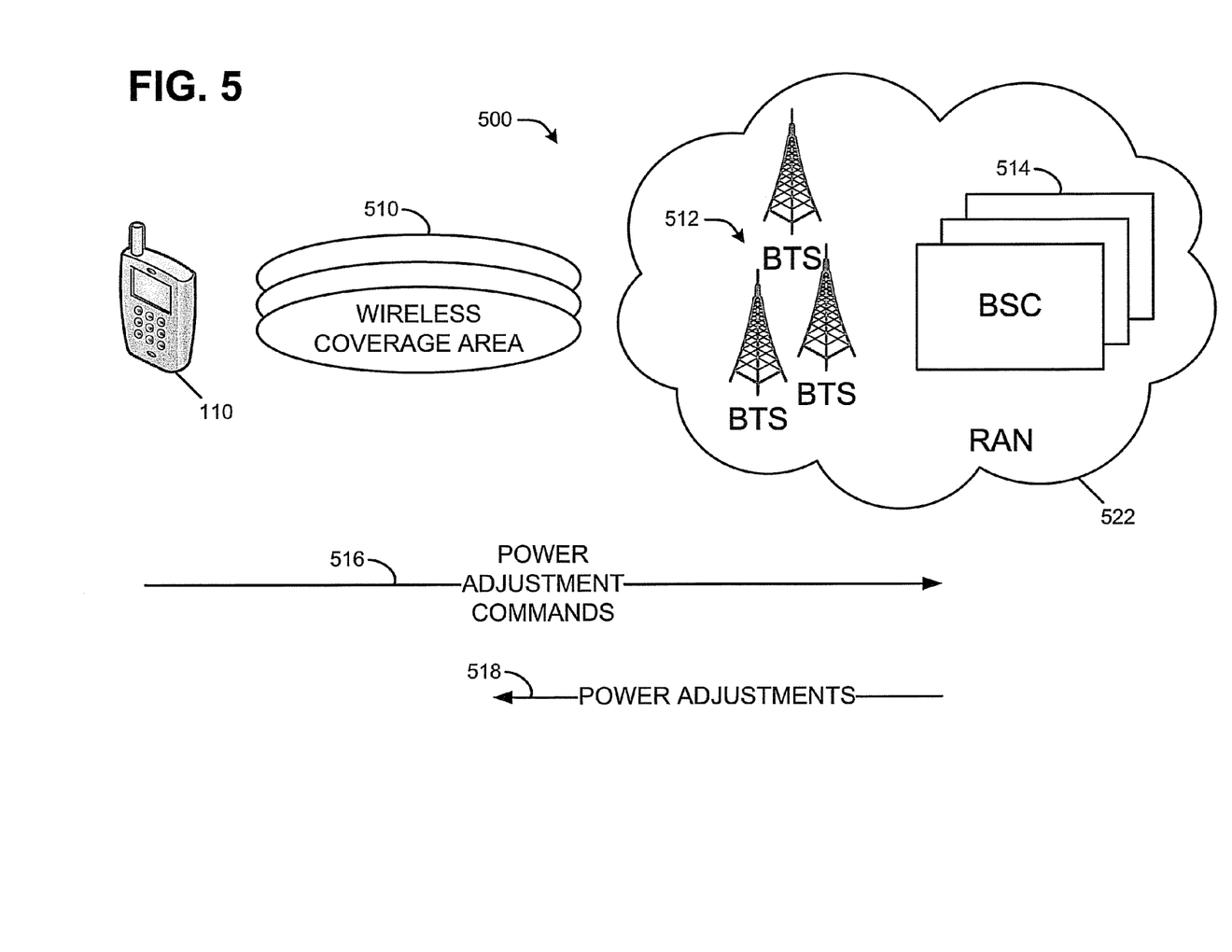
FIG. 5 is a system for forward link power control, in accordance with an exemplary embodiment.

FIG. 5 illustrates an exemplary system 500 comprising RAN 522, which further comprises one or more BTS's 512 and one or more BSC's 514. BTS's 512 radiate to define a plurality of wireless coverage areas 510. Wireless coverage areas 510 may be included within the active set of WCD 110. Alternative embodiments of RAN 522 may include other components, such as wireless coverage areas 510, PDSN's 118, MSC's 122, and so on.

WCD 110 may transmit power adjustment commands 516 into the RAN. The RAN may respond by instructing BTS's 512 to make power adjustments 518 to at least one of wireless coverage areas 510. Power adjustment commands 516 may comprise power increase commands, power decrease commands, or both. Power adjustments 518 may affect the increase or decrease of power in wireless coverage areas 510. Preferably, power is increased or decreased in a subset of the wireless coverage areas 510 in the active set of WCD 110. However, as more power increase or decrease commands arrive in the RAN, the RAN may instruct the BTS's 512 to increase or decrease power in a larger subset of wireless coverage areas 510.

Exemplary embodiments of the present invention have been described above. Those skilled in the art will understand, however, that changes and modifications may be made to these embodiments without departing from the true scope and spirit of the invention, which is defined by the claims.

What is claimed is:

1. A method for controlling transmission power between a wireless communication device (WCD) and a radio access network (RAN), wherein the WCD is served by a plurality of wireless coverage areas defined by the RAN, the method comprising:

receiving into the RAN from the WCD a plurality of power adjustment commands;

for each received power adjustment command, responsively identifying one or more wireless coverage areas in which to adjust transmission power, and adjusting the transmission power in each of the identified one or more wireless coverage areas, wherein identifying the one or more wireless coverage areas comprises:

(a) making a determination of whether the RAN has received a threshold extent of power adjustment commands from the WCD;

(b) if the determination is that the RAN has not received the threshold extent of power adjustment commands from the WCD, identifying as the one or more wireless coverage areas a first subset of the plurality of wireless coverage areas; and (c) if the determination is that the RAN has received the threshold extent of power adjustment commands from the WCD, identifying as the one or more wireless coverage areas a second subset of the plurality of wireless coverage areas, wherein the second subset is different than the first subset.

2. The method of claim 1, wherein the power adjustment commands are power decrease commands.

3. The method of claim 1, wherein the power adjustment commands are power increase commands.

4. The method of claim 3, wherein the second subset encompasses the first subset.

5. The method of claim 3, further comprising receiving into each wireless coverage area a report of the measured forward link power at the WCD for the wireless coverage area.

6. The method of claim 5, wherein identifying the one or more wireless coverage areas in which to increase transmission power comprises:
ranking the plurality of coverage areas in order of their forward link power measured at the WCD; and
selecting as the one or more wireless coverage areas in which to increase transmission power the wireless coverage areas with the highest measured forward link power.

7. The method of claim 3, wherein transmission power is a forward link transmission power transmitted within a wireless coverage area.

8. The method of claim 7, wherein increasing the transmission power in each of the identified one or more wireless coverage areas comprises increasing the forward link transmission power in each of the identified one or more wireless coverage areas.

9. The method of claim 3, wherein the plurality of wireless coverage areas comprises an active set of wireless coverage areas for the WCD.

10. The method of claim 3, wherein the power adjustment command is a power sense measurement message.

11. A method for controlling transmission power between a wireless communication device (WCD) and a radio access network (RAN), wherein the WCD is served by a plurality of wireless coverage areas defined by the RAN, the method comprising:
receiving into the RAN from the WCD a plurality of power increase commands, including at least a first set of power increase commands and a second set of power increase commands;
responsive to each power increase command of the first set, increasing transmission power in a first subset of the plurality of wireless coverage areas; and
responsive to each power increase command in the second set, increasing transmission power in a second subset of the plurality of wireless coverage areas, wherein the second subset is larger than the first subset and includes the first subset.

12. The method of claim 11, wherein the second set of power increase commands follows the first set of power increase commands.

13. The method of claim 11, wherein the plurality of power increase commands further includes a third set of power increase commands, the method further comprising:
in response to each power increase command in the third set, increasing transmission power in a third subset of the plurality of wireless coverage areas, wherein the third subset is larger than the second subset and includes the second subset.

14. The method of claim 13, wherein the third set of power increase commands follows the second set of power increase commands.

15. A system for controlling power transmission between a wireless communication device (WCD) and a radio access network (RAN), wherein the WCD is served by a plurality of wireless coverage areas defined by the RAN, the RAN comprising:
one or more base transceiver stations (BTS's);
one or more base station controllers (BSC's);
wherein the one or more BSC's control the one or more BTS's;
wherein the one or more BTS's radiate to define the plurality of wireless coverage areas;
wherein the RAN receives a plurality of power increase commands, including at least a first set of power increase commands and a second set of power increase commands;
wherein in response to each power increase command of the first set, the RAN increases power in a first subset of the plurality of wireless coverage areas; and
wherein in response to each power increase command of the second set, the RAN increases power in a second subset of the plurality of wireless coverage areas, wherein the second subset is larger than the first subset and includes the first subset.

16. The system of claim 15, wherein the second set of power increase commands follows the first set of power increase commands.

17. The system of claim 15, wherein each wireless coverage area receives a report of the measured forward link power at the WCD for each wireless coverage area.

18. The system of claim 17, wherein the RAN increasing power in the first subset of the plurality of wireless coverage areas further comprises:
ranking the plurality of wireless coverage areas in order of their forward link power measured at the WCD; and
selecting as the first subset of the plurality of wireless coverage areas the wireless coverage areas with the highest forward link power measured at the WCD; and
increasing power in the first subset of the plurality of wireless coverage areas.

19. The system of claim 17, wherein the RAN increasing power in the second subset of the plurality of wireless coverage areas further comprises:
ranking the plurality of wireless coverage areas in order of forward link power measured at the WCD;
selecting as the second subset of the plurality of wireless coverage areas the wireless coverage areas with the highest forward link power measured at the WCD; and
increasing power in the selected second subset of the plurality of wireless coverage areas.

20. The system of claim 15, wherein in response to each power increase command, at least one BTS increases transmission power on a forward link.

* * * * *